United States Patent [19]

Ohishi et al.

[11] Patent Number: 5,742,341
[45] Date of Patent: Apr. 21, 1998

[54] VIDEO CAMERA HAVING A PLURALITY OF HOUSINGS FOR A VARIETY OF OPERATIONS

[75] Inventors: Masayuki Ohishi, Neyagawa; Tetsuya Ohno, Hirakata; Shusaku Yamamoto, Moriguchi; Yoshitada Moriyasu, Katano; Shouzou Tomikawa, Nabari; Seiki Morishita, Hirakata; Kazuyoshi Suzuki, Kadoma, all of Japan

[73] Assignee: Matsushita Electric Industrial Co., Ltd., Osaka-fu, Japan

[21] Appl. No.: 440,234

[22] Filed: May 12, 1995

[30] Foreign Application Priority Data

| May 12, 1994 | [JP] | Japan | 6-98525 |
| May 12, 1994 | [JP] | Japan | 6-98526 |
| May 12, 1994 | [JP] | Japan | 6-98527 |
| May 12, 1994 | [JP] | Japan | 6-98528 |
| May 12, 1994 | [JP] | Japan | 6-98529 |
| May 12, 1994 | [JP] | Japan | 6-98530 |

[51] Int. Cl.$^6$ .................... H04N 5/222; H04N 5/225
[52] U.S. Cl. .................... 348/373; 348/333; 348/375; 348/376; 396/374; 358/906
[58] Field of Search .................... D16/200, 202, D16/205, 208, 211, 212, 218, 219, 220; 348/333, 334, 373, 374, 375, 376; 354/75, 76, 80, 81; 358/906, 909.1; 396/373, 374, 378, 383; H04N 5/225, 5/222

[56] References Cited

U.S. PATENT DOCUMENTS

| D. 372,255 | 7/1996 | Nakamura | D16/202 |
| D. 372,721 | 8/1996 | Tanaka | D16/202 |
| 4,420,773 | 12/1983 | Toyoda et al. | 358/335 |
| 4,945,424 | 7/1990 | Hiroki et al. | 358/335 |
| 5,119,203 | 6/1992 | Hosaka et al. | 358/229 |
| 5,303,062 | 4/1994 | Kawarai et al. | 358/335 |
| 5,341,171 | 8/1994 | Mori et al. | 348/373 |
| 5,493,353 | 2/1996 | Chen | 354/76 |
| 5,539,463 | 7/1996 | Morikawa et al. | 348/375 |

FOREIGN PATENT DOCUMENTS

| 0 444 849 | 9/1991 | European Pat. Off. | H04N 5/225 |
| 0 565 322 | 10/1993 | European Pat. Off. | H01M 2/10 |
| 0 581 286 | 2/1994 | European Pat. Off. | H04N 5/225 |
| 0581286 | 2/1994 | European Pat. Off. | H04N 5/225 |
| 39 18 279 | 12/1990 | Germany | H04N 5/225 |
| 61-150474 | 7/1986 | Japan | H04N 5/225 |
| 61-284889 | 12/1986 | Japan | H04N 5/225 |
| 63-099677 | 4/1988 | Japan | H04N 5/225 |
| 63-287176 | 11/1988 | Japan | H04N 5/232 |
| 1246968 | 10/1989 | Japan | H04N 5/232 |
| 2312450 | 12/1990 | Japan | H04N 5/225 |

Primary Examiner—Andrew Faile
Assistant Examiner—Ngoc-yen Vu
Attorney, Agent, or Firm—Wenderoth, Lind & Ponack

[57] ABSTRACT

A video camera includes a first housing accommodating a recording and reproducing device for recording and reproducing video signals and having a recess defined therein on an upper surface thereof, and a second housing having a first surface and a second surface opposite to each other and housed in the recess of the first housing at its rest position at which the first surface of the second housing is opposed to the upper surface of the first housing. The second housing has a recess defined therein on the second surface thereof. The video camera also includes a monitor screen mounted on the first surface of the second housing and a support member having a first end to which the second housing is hingedly connected and a second end hingedly connected to the first housing. The support member is housed in the recess of the second housing when the second housing is in the rest position.

9 Claims, 19 Drawing Sheets

VIDEO CAMERA HAVING A PLURALITY OF HOUSINGS FOR A VARIETY OF OPERATIONS

BACKGROUND OF THE INVENTION

1. Field of the Invention

The present invention relates to a video camera having both of a monitor screen and a finder.

2. Description of Related Art

In recent years, video cameras have come into wide use in Japan and some other countries and are increasingly diversified. Although video cameras for beginners are sold nowadays that have been made simple in operation by removing various functions, the main current is still the use of video cameras having a variety of functions. There are highly developed video cameras for professionals having a wide variety of functions to realize faithful reproducibility.

Some of the video cameras have a monitor screen that makes high-angle videoing or low-angle videoing easier than those having a finder through which videoing is carried out. For this reason, the video cameras with the monitor screen are suited for use in a wide variety of videoing. Also, they have the advantage of enabling the user to enjoy the recorded matter immediately after recording thereof or to confirm the recording condition.

In practice, however, conventional video cameras with the monitor screen often encounter difficulties in videoing a subject of various poses for the following reasons.

(1) The monitor screen is hingedly connected at only its one end with the camera body, allowing a mere pop-up thereof about a hinge.

(2) The monitor screen is secured to the camera body, and only an operating portion accommodating a camera portion is allowed to rotate relative to the camera body.

Some of the conventional video cameras comprise a first housing accommodating a magnetic recording and reproducing means, a monitor screen mounted on one side of the first housing, and a second housing accommodating a TV camera portion and rotatably mounted on the other side of the first housing, while some comprise a single housing in or on which a magnetic recording and reproducing means, a TV camera portion, a monitor screen, and a finder are all accommodated or mounted.

FIGS. 29 and 30 depict a conventional video camera 41 comprising a first housing 42 accommodating a magnetic recording and reproducing means, a second housing 43 accommodating a TV camera portion and rotatably mounted on one side of the first housing 42, a monitor screen 44 mounted on the rear surface of the first housing 42, and a lens 47 secured to the second housing 43. Although an image of a subject being videoed through the lens 47 can be confirmed with the monitor screen 44, it is difficult for the user to follow a vertically or horizontally fast-moving subject while viewing the image on the monitor screen 44. In some cases, the image on the monitor screen 44 is unclear and cannot readily be confirmed under the influence of environmental external light during videoing, for example, at an outdoor bright place.

FIGS. 31 to 33 depict another conventional video camera 50, which comprises a first housing 51 accommodating a magnetic recording and reproducing means, a monitor screen 52 rotatably mounted on the first housing 51, and a finder 53 securely mounted on the first housing 51. In this construction, an image of a subject being videoed through a lens 54 can be confirmed by the finder 53 or the monitor screen 52. However, because the lens 54 is fixedly mounted on the first housing 51 and the monitor screen 52 is hingedly connected at only its one end with the first housing 51, as shown in FIG. 33, if the user is required to lift the video camera 50 to video frontwardly or downwardly, the user cannot view the monitor screen and, hence, cannot confirm the videoing condition.

Referring back to FIGS. 29 and 30, the conventional video camera 41 also comprises a loudspeaker 45 mounted on an upper portion of the first housing 42 for outputting reproduced sound and a microphone 46 mounted on an upper front portion of the second housing 43 for collecting environmental sound.

With this video camera 41, the subject videoed by the TV camera portion is recorded on a magnetic tape by the magnetic recording and reproducing means accommodated in the first housing 42, and the image of the subject is displayed on the monitor screen 44. At this moment, environmental sound is collected by the microphone 46 and is recorded on the magnetic tape by the magnetic recording and reproducing means. During reproduction, a reproduced image is displayed on the monitor screen 44, while reproduced sound is outputted from the loudspeaker 45.

In this construction, however, because the loudspeaker 45, mounted on the upper portion of the first housing 42, is directed upwardly, sound outputted therefrom during reproduction escapes upwardly and, hence, the user who is generally positioned on the rear side of the first housing 42 to confirm the monitor screen 44 has difficulty in hearing the output sound.

Furthermore, because the user is required to operate various buttons while viewing the subject though the finder or with the monitor screen during videoing, it is quite natural that attention has been paid to the arrangement or positions of the buttons according to frequencies in use. In general, however, the conventional video cameras do not have a good operability. During videoing with the use of a conventional video camera having the finder, the user's left hand serves merely to stabilize the camera body, while during videoing with the use of a conventional video camera 40 having the monitor screen, the left hand serves merely to grip the video camera 40, as shown in FIG. 28. The reason for this is that a variety of buttons are so arranged as to be manipulated mostly by the user's right hand.

As well as the operability, the weight balance of the video cameras is quite important. If the video cameras are not well balanced in weight, fatigue of the user during videoing increases, adversely affecting videoed images.

FIG. 34 depicts a conventional video camera 60 on which a tuner 61 is removably mounted enabling TV broadcast to be displayed on the monitor screen 62. In this video camera 60, however, because the tuner 61 is mounted on one side thereof, not only the width of the video camera 60 becomes large, but also the operability thereof is not so good during manipulation.

SUMMARY OF THE INVENTION

The present invention has been developed to overcome the above-described disadvantages.

It is accordingly an objective of the present invention to provide an improved video camera having a good operability and capable of readily videoing a subject of various poses.

Another objective of the present invention is to provide a video camera in which a monitor screen is, when not in use, neatly housed with no unnecessary projections on the camera body.

A further objective of the present invention is to provide a video camera which is well balanced in weight to reduce fatigue of the user during videoing.

A still further objective of the present invention is to provide a video camera suited for use in videoing a fast-moving subject, effecting low-angle videoing or high-angle videoing, or videoing the user himself with the subject being confirmed.

Another objective of the present invention is to provide a video camera from which easy-to-catch sound is outputted.

A further objective of the present invention is to provide a video camera which is not increased in width and is good in stability even when a tuner is mounted thereon.

In accomplishing the above and other objectives, a video camera according to the present invention comprises a first housing accommodating a recording and reproducing means for recording and reproducing video signals and having a recess defined therein on an upper surface thereof, and a second housing having a first surface and a second surface opposite to each other and housed in the recess of the first housing at its rest position at which the first surface of the second housing is opposed to the upper surface of the first housing. The second housing has a recess defined therein on the second surface thereof. The video camera also comprises a monitor screen mounted on the first surface of the second housing and a support member having a first end to which the second housing is hingedly connected and a second end hingedly connected to the first housing. The support member is housed in the recess of the second housing when the second housing is in the rest position.

Conveniently, the depth of the recess of the second housing is made approximately equal to the thickness of the support member. The second housing can be fixed relative to the first housing in a spaced relationship.

In the above-described construction, there are no unnecessary projections on the camera body when the second housing is in the rest position, making the video camera compact. Also, because the support member enables the second housing to be fixed to and spaced from the first housing, the video camera of the present invention is suited for use in videoing a subject of a varying pose.

In another form of the present invention, a video camera comprises a first housing accommodating a recording and reproducing means for recording and reproducing video signals and having a first side and a second side opposite to each other, a third housing mounted on the first side of the first housing, a camera portion required for videoing and accommodated in the third housing, and a fourth housing mounted on the second side of the first housing and accommodating a battery. At least two operating portions are separately mounted on the third housing and the fourth housing, respectively, for performing a variety of operations.

Advantageously, the operating portion of the third housing includes a first group of buttons and the operating portion of the fourth housing includes a second group of buttons, the first group of buttons having higher frequencies in use than the second group of buttons.

Because said at least two operating portions are separately mounted on the third and fourth housings, respectively, the user can manipulate the video camera using both hands during videoing. Furthermore, the arrangement of the first group of buttons having higher frequencies in use on the third housing and that of the second group of buttons having lower frequencies in use on the fourth housing enhances the operability of the video camera during videoing.

In a further form of the present invention, a video camera comprises a first housing accommodating a recording and reproducing means for recording and reproducing video signals and having a first side and a second side opposite to each other, a monitor screen hingedly connected to an upper portion of the first housing so that the monitor screen can be fixed relative to the first housing at a given angle, a third housing mounted on the first side of the first housing, a camera portion required for videoing and accommodated in the third housing, and a fourth housing mounted on the second side of the first housing and accommodating a battery.

Advantageously, third housing and the fourth housing are substantially balanced in weight.

When the monitor screen is inclined relative to the first housing at a desired angle during low- or high-angle videoing, the positional relationship of each of the third and fourth housings relative to the first housing does not change and, hence, the lateral weight balance of the video camera does no change in a direction in which videoing is carried out.

In a still further form of the present invention, a video camera comprises a first housing accommodating a recording and reproducing means for recording and reproducing video signals, a monitor screen rotatably mounted on the first housing, a third housing rotatably mounted on one side of the first housing, a camera portion required for videoing and accommodated in the third housing, and a finder rotatably mounted on the third housing.

Conveniently, each of the monitor screen and the finder is automatically turned on or off according to the position thereof.

Even if videoing conditions are not good such as, for example, when the user is difficult to view the monitor screen according to environmental circumstances, when the user, the subject and the video camera are not in an ordinary positional relationship or when the user cannot follow a fast-moving subject with the use of the monitor screen, the user does not fail to video the subject and can record an image thereof on a magnetic tape accommodated in the video camera by appropriately rotating the monitor screen, the third housing or the finder. Also, the monitor screen and the finder are to be automatically turned on or off according to the position of the former relative to the first housing and that of the latter relative to the third housing, thus eliminating unnecessary simultaneous image outputs on both the monitor screen and the finder for power saving.

In another form of the present invention, a video camera comprises a first housing accommodating a recording and reproducing means for recording and reproducing video signals and having a front surface and a rear surface opposite to each other, a third housing rotatably mounted on one side of the first housing, a camera portion required for videoing and accommodated in the third housing, a loudspeaker mounted on the rear surface of the first housing for outputting sound reproduced by the recording and reproducing means, and a microphone mounted on the front surface of the first housing for collecting environmental sound.

The arrangement of the loudspeaker on the rear surface of the first housing enables the user to readily catch output sound during reproduction.

In a further form of the present invention, a video camera comprises a first housing, a monitor screen mounted on the first housing, a loudspeaker accommodated in the first housing, and a fifth housing removably mounted on a lower surface of the first housing and accommodating a tuner for receiving TV signals. Upon receipt of the TV signals, TV broadcast is outputted to the monitor screen and the loudspeaker.

Conveniently, the video camera further comprises a first operating portion mounted on the first housing and a second operating portion mounted on the fifth housing, wherein the fifth housing has a partially protruding portion protruding from the first housing, the second operating portion being positioned on the partially protruding portion at a location close to the first operating portion.

Because the fifth housing accommodating the tuner is mounted on the lower surface of the first housing, the width of the video camera does not become large and, hence, the video camera can be readily and stably manipulated. Also, the arrangement of the second operating portion on the partially protruding portion of the fifth housing in the proximity of the first operating portion of the first housing maintains the operability of the video camera good even when the tuner is mounted thereon.

BRIEF DESCRIPTION OF THE DRAWINGS

The above and other objectives and features of the present invention will become more apparent from the following description of preferred embodiments thereof with reference to the accompanying drawings, throughout which like parts are designated by like reference numerals, and wherein.

DETAILED DESCRIPTION OF THE PREFERRED EMBODIMENTS

The term "videoing" as employed throughout this specification is defined as meaning "to videotape".

Figure 1:
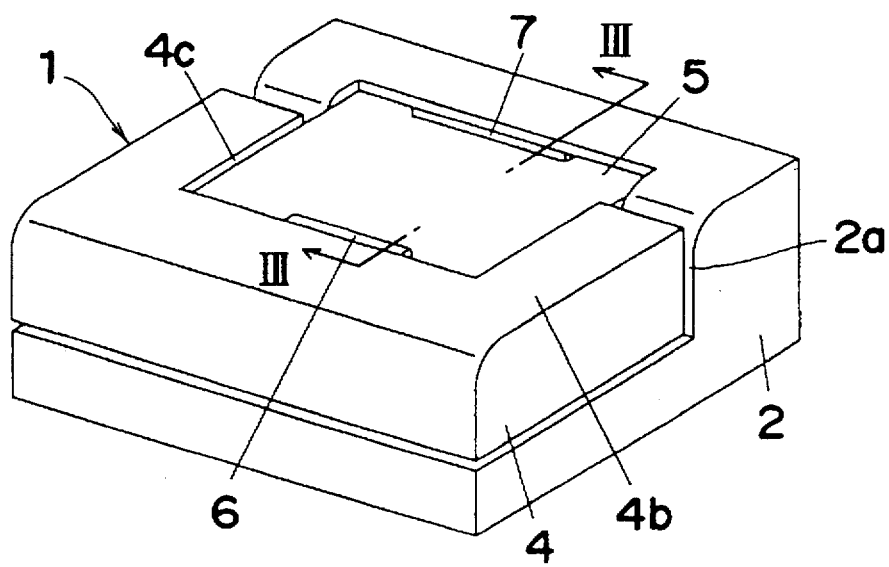
FIG. 1 is a schematic perspective view of a camera body of a video camera according to the present invention.

Referring now to the drawings, there is schematically shown in FIG. 1 a video camera 1 according to the present invention, which comprises a first housing 2 having a recess 2a defined therein on the upper surface thereof and a second housing 4 hingedly connected to the first housing 2 by means of a support member 5. The first housing 2 accommodates a magnetic recording and reproducing means for recording and reproducing video signals and sound signals on and from a cassette tape accommodated therein, while the second housing 4 has a monitor screen 3, illustrated in FIG. 7, on its first surface 4a. When the second housing 4 is in its rest position shown in FIG. 1, the second housing 4 is entirely housed in the recess 2a of the first housing 2 with the first surface 4a of the second housing 4 opposed to the upper surface of the first housing 2.

Figure 2:
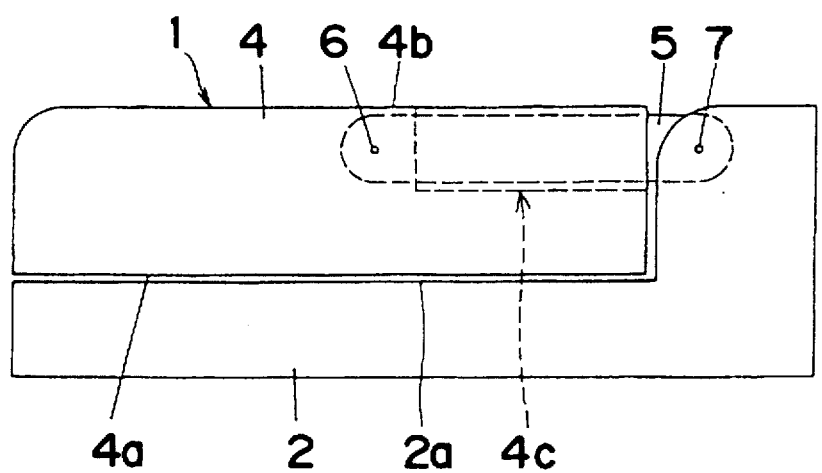
FIG. 2 is a schematic side view of the camera body of FIG. 1.
Figure 3:
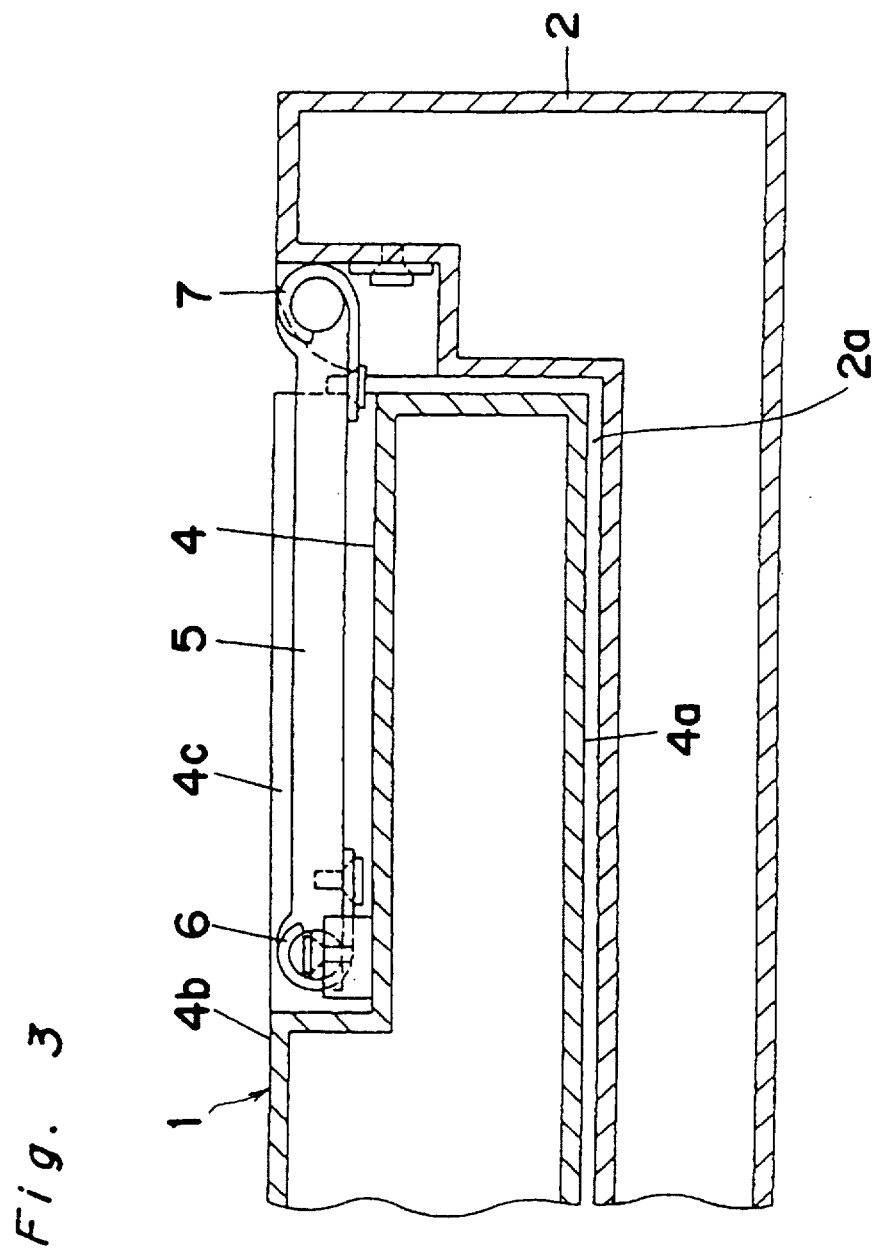
FIG. 3 is an enlarged fragmentary sectional view taken along line III—III in FIG. 1.

As shown in FIGS. 2 and 3, the support member 5 has a first hinge 6 mounted on one end thereof and a second hinge 7 mounted on the other end thereof. The support member 5 is rotatably mounted on the first housing 2 via the second hinge 7, while the second housing 4 is rotatably mounted on the support member 5 via the first hinge 6. The length of the support member 5, the positions of the first and second hinges 6 and 7 relative to the second and first housings 4 and 2, respectively, and the like are appropriately determined so that the second housing 4 can be fixed relative to the first housing 2 at any desired angle in a spaced relationship. By so doing, the monitor screen 3 provided on the first surface 4a of the second housing 4 can be inclined at various angles with respect to the first housing 2 through a range of more than 180°, as shown in FIGS. 4 to 9, in readiness for videoing of a variety of subjects.

The second housing 4 has a recess 4c defined therein on a second surface 4b thereof opposite to the first surface 4a. Because the recess 4c has a depth approximately equal to the thickness of the support member 5, the support member 5 is entirely housed in the recess 4c when the second housing 4 is in the rest position in which the first surface 4a of the second housing 4 is opposed to the upper surface of the first housing 2. This construction contributes to the compactness of the video camera 1.

However, the depth of the recess 4c can be made greater than the thickness of the support member 5 unless the compactness of the video camera 1 is hindered. Also, although the first and second hinges 6 and 7 FIG. 3 as being of different configurations, they may have identical configurations. Furthermore, the two hinges 6 and 7 are not necessarily required, and the monitor screen 3 may be mounted on the upper surface of the first housing 2 via a single hinge about which the monitor screen 3 is allowed to rotate.

The video camera 1 of the above-described construction can be readily adapted for various poses to be videoed.

Figure 4:
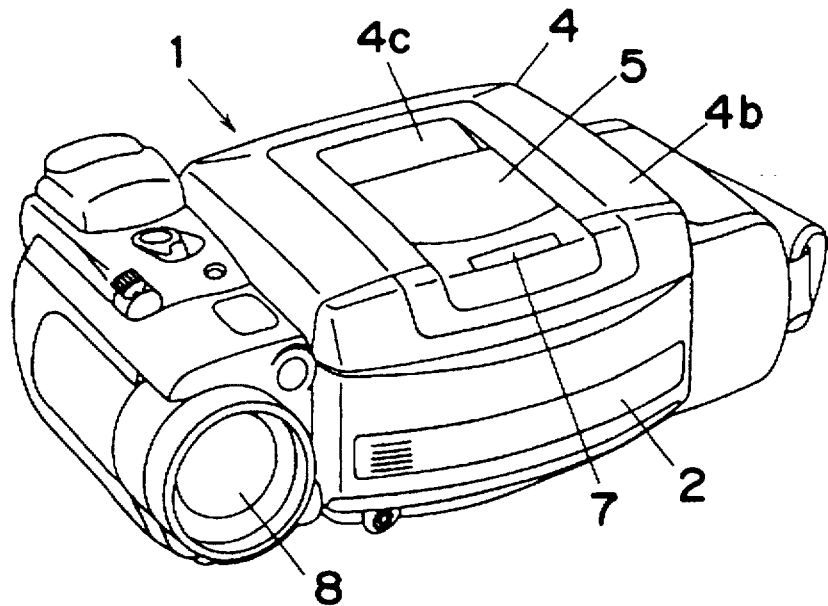
FIG. 4 is a front perspective view of the video camera according to the present invention with a monitor screen housed in its rest position.
Figure 5:
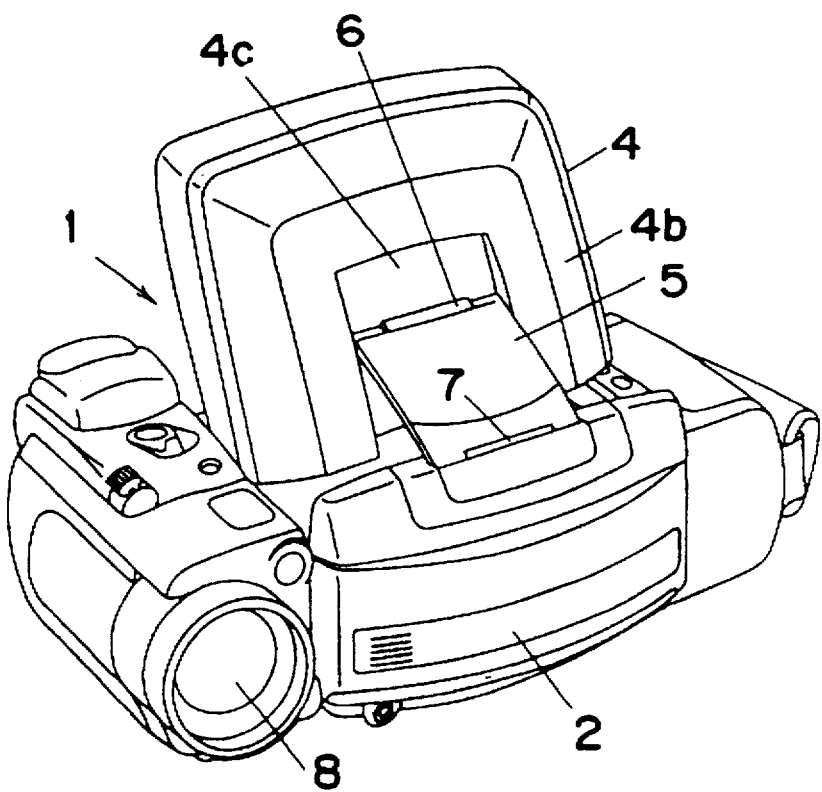
FIG. 5 is a front perspective view of the video camera with the monitor screen being rotated to its ordinary videoing position.

More specifically, when the second housing 4 is in the rest position, the support member 5 is entirely and neatly housed in the recess 4c of the second housing 4 with no unnecessary projections on the camera body, as shown in FIG. 4. When videoing is desired, the second housing 4 is first lifted from the rest position so as to be spaced from the first housing 2 and is subsequently rotated by a desired angle, as shown in FIG. 5. The second housing 4 can be inclined against the support member 5, as shown in FIGS. 6 and 7, for fixing thereof on the first housing 2.

Figure 6:
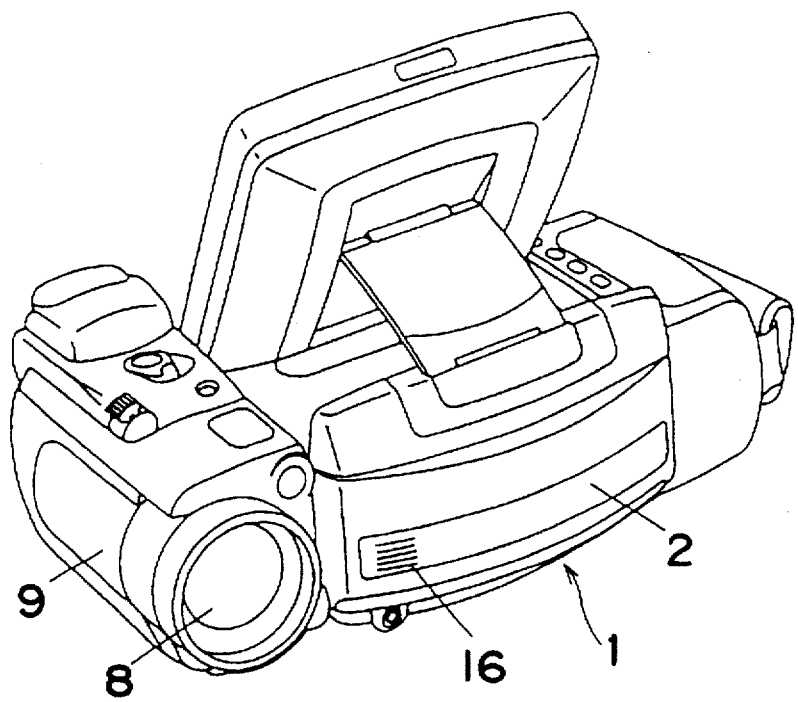
FIG. 6 is a front perspective view of the video camera with the monitor screen set at its ordinary videoing position.
Figure 7:
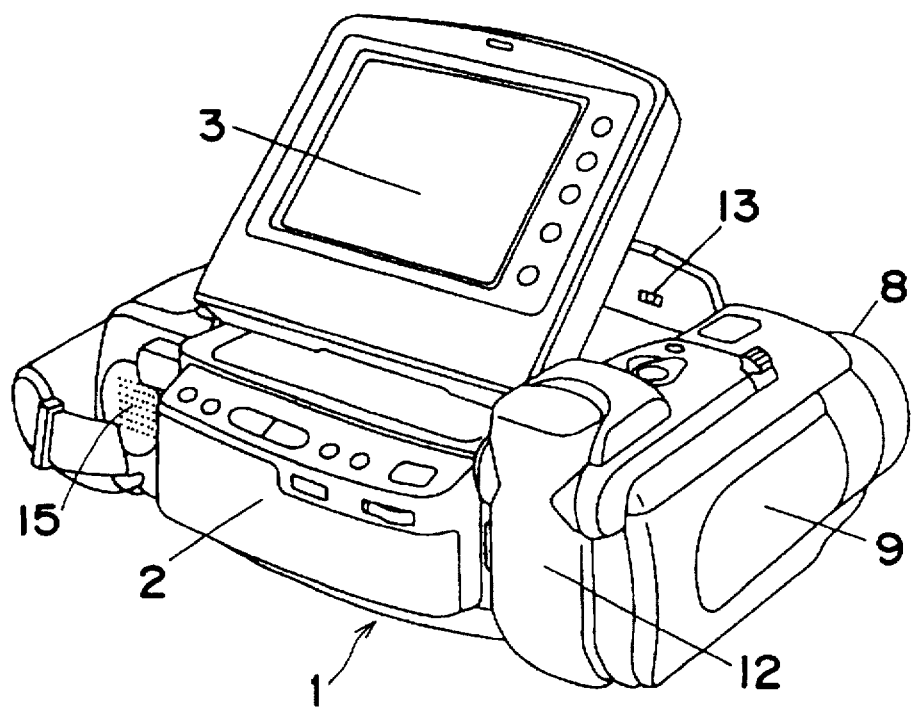
FIG. 7 is a rear perspective view of the video camera of FIG. 6.
Figure 8:
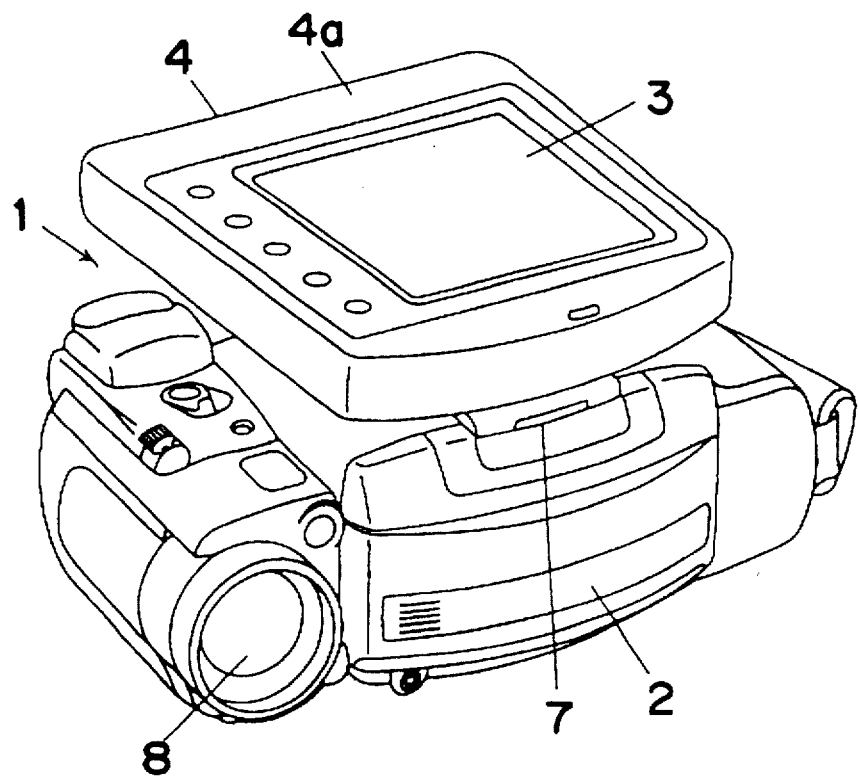
FIG. 8 is a front perspective view of the video camera with the monitor screen set at its low-angle videoing position.

When low-angle videoing is desired, the second housing 4 is further rotated from the ordinary videoing position shown in FIGS. 6 and 7 and is fixed with the second surface 4b of the second housing 4 opposed to the upper surface of the first housing 2 and with the monitor screen 3 directed upwardly, as shown in FIG. 8.

Figure 9:
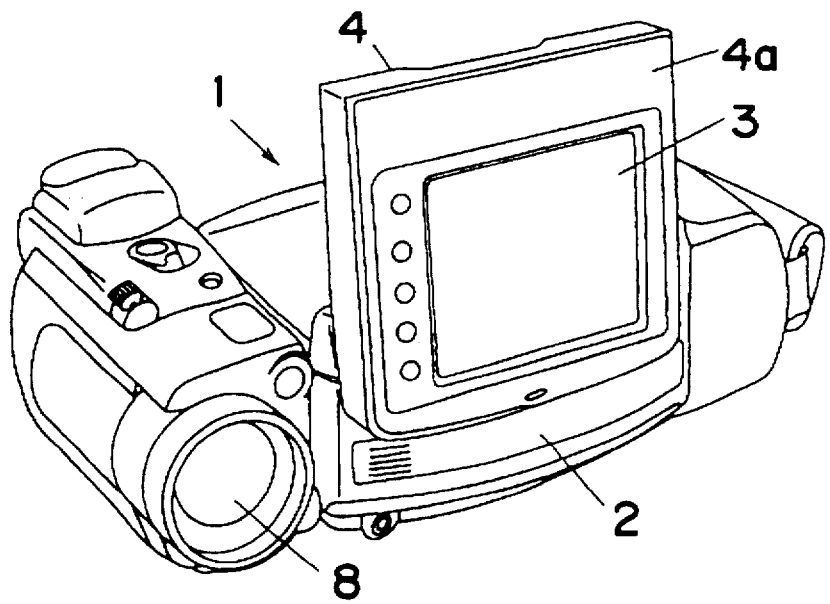
FIG. 9 is a front perspective view of the video camera with the monitor screen set to video the user himself.
Figure 10:
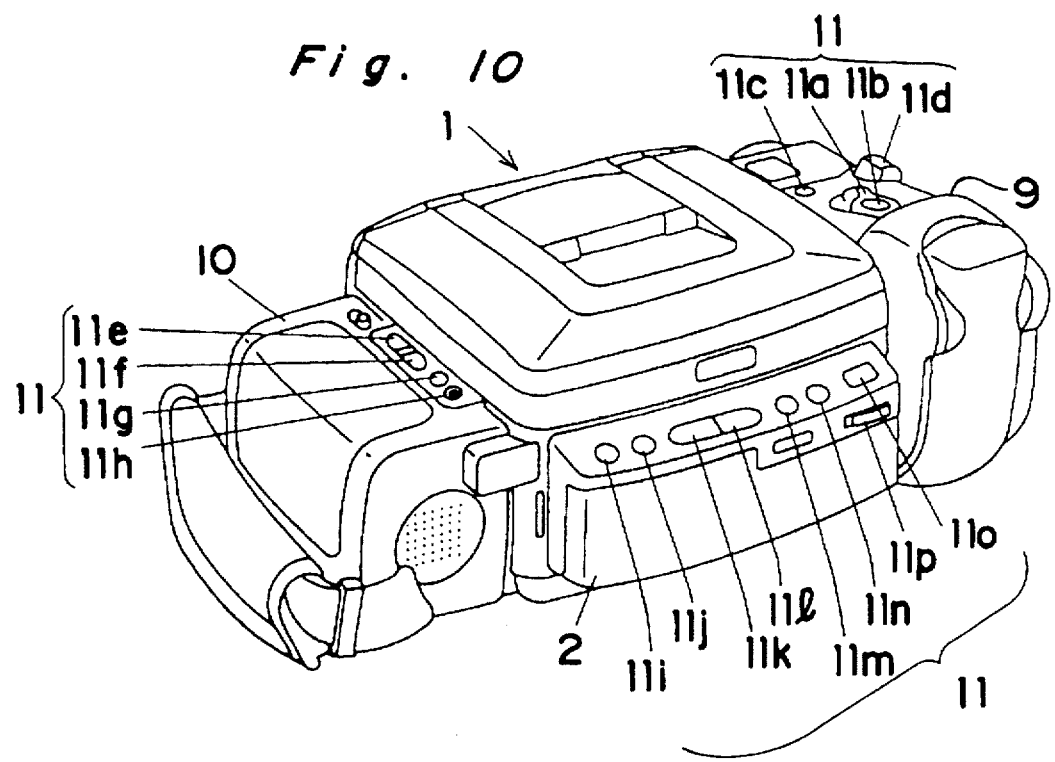
FIG. 10 is a rear perspective view of the video camera of FIG. 4.
Figure 11:
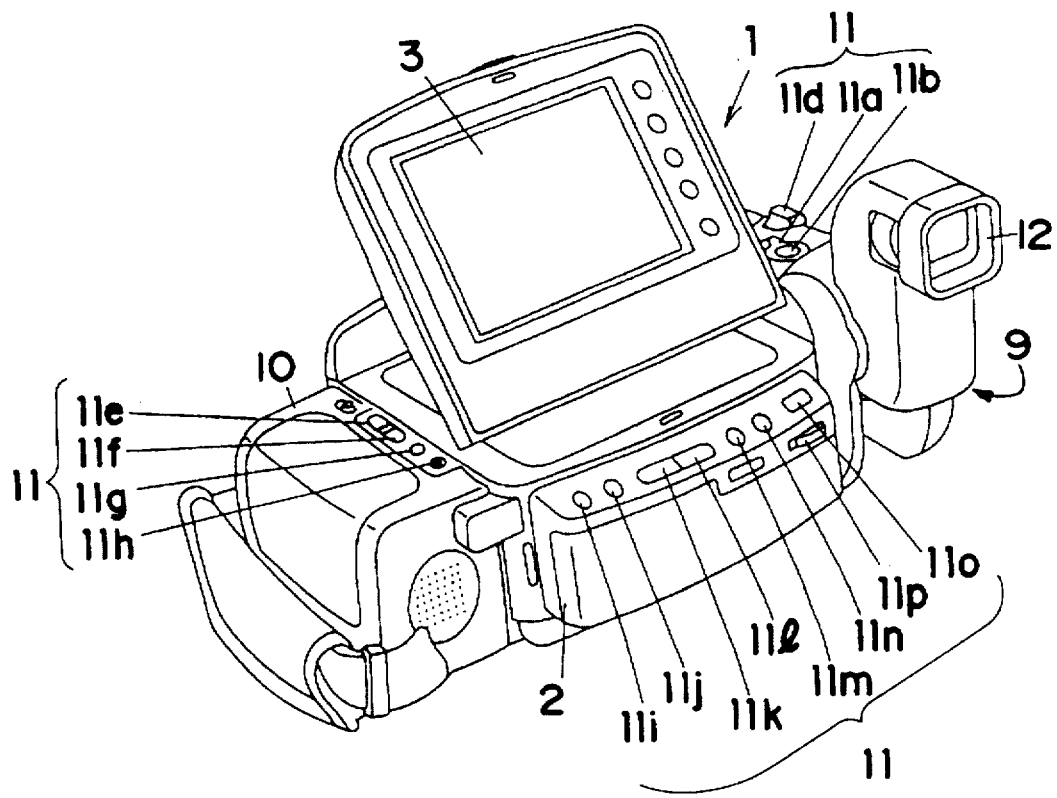
FIG. 11 is a rear perspective of the video camera with the monitor screen set at its ordinary videoing position and with a finder erected.
Figure 12:
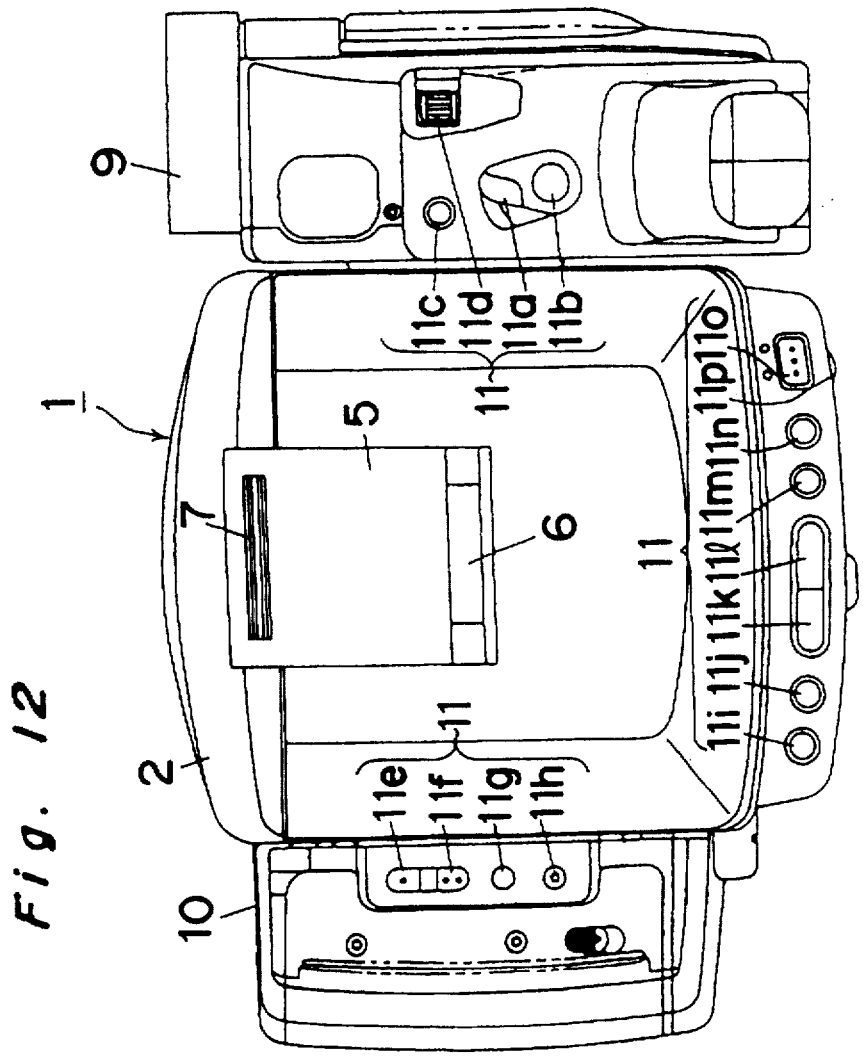
FIG. 12 is a top plan view of the video camera of FIG. 10.
Figure 13:
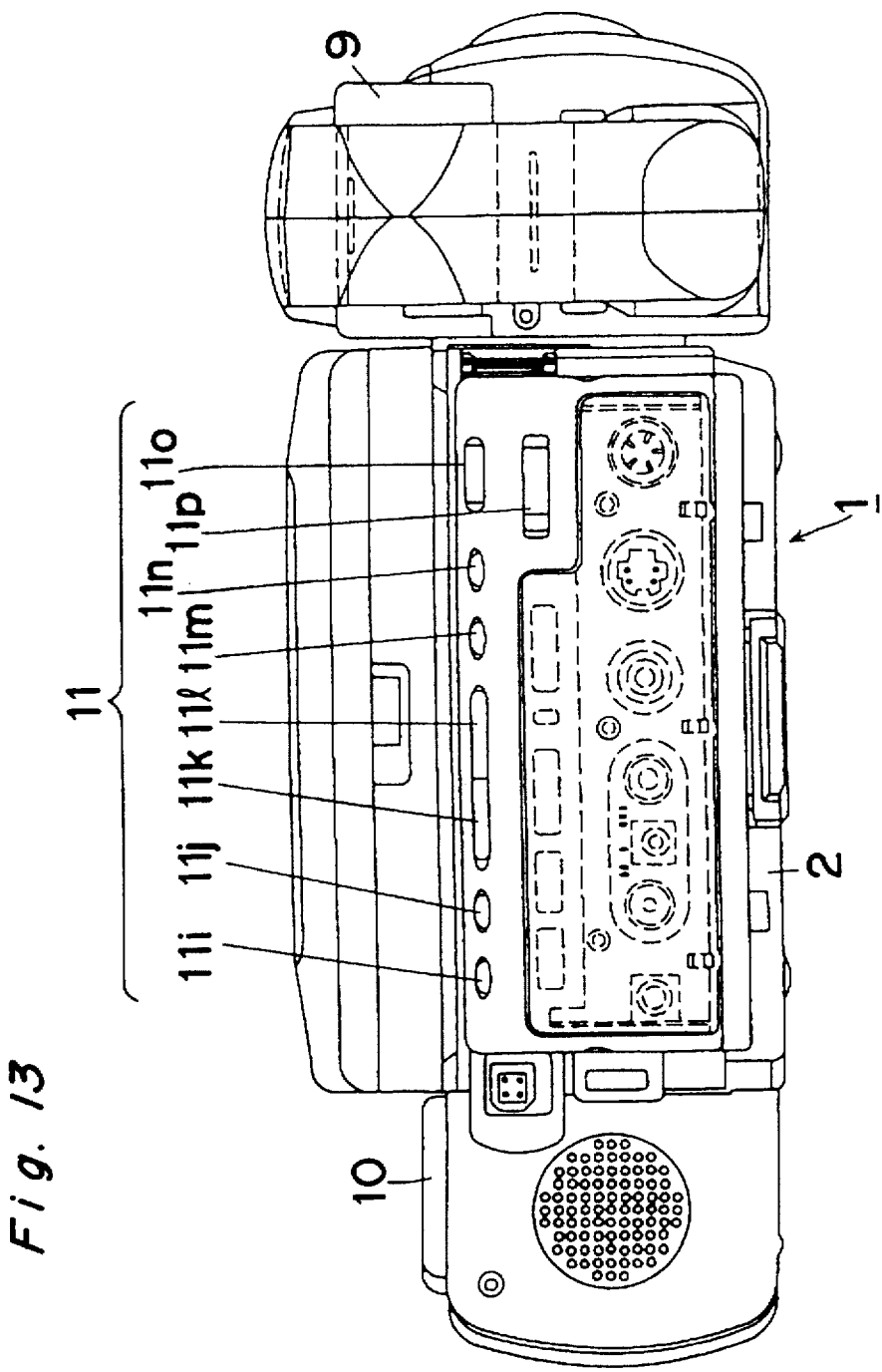
FIG. 13 is a rear view of the video camera of FIG. 10.

When the user wishes to video himself, the second housing 4 is further rotated from the low-angle videoing position shown in FIG. 8 and is fixed with the monitor screen 3 directed in the same direction as a lens 8, as shown in FIG. 9.

Furthermore, high-angle videoing is readily possible either by further rotating the second housing 4 or by lifting the video camera 1 and viewing the monitor screen 3 obliquely upwardly with the second housing 4 fixed at the position shown in FIG. 5

As shown in FIGS. 10 to 15, the video camera 1 also comprises a third housing 9 and a fourth housing 10 mounted on opposite sides of the first housing 2, i.e. on the right-hand side and the left-hand side of the first housing 2, respectively. The third housing 9 accommodates a TV camera portion required for videoing, while a battery is removably mounted in the fourth housing 10.

The video camera 1 has at least two operating portions 11 separately mounted thereon and, in the illustrated embodiment, the video camera 1 has three separate operating portions 11. Of the three operating portions 11, two are required for videoing and are mounted on the upper surfaces of the third and fourth housings 9 and 10, respectively, which are held by the user during videoing. Various operations can be carried out using both hands of the user with the video camera 1 held thereby. The third operating portion 11 is used for reproduction and the like after the videoing and is mounted on a rear portion of the first housing 2.

The operating portion 11 mounted on the upper surface of the third housing 9 includes an on-off switch 11a, a record button 11b for staring and stopping videoing, a still-image button 11c for performing continuous videoing of still images, and a zoom button 11d for performing zooming, all of which have high frequencies in use. The reason for mounting these switches or buttons on the third housing 9 is that there are many right-handed persons.

On the other hand, the operating portion 11 mounted on the upper surface of the fourth housing 10 includes a plurality of buttons having relatively low frequencies in use such as, for example, a first focusing button 11e which is, when a subject situated on one side of a glass windowpane remote from the video camera 1 is desired to be focused, used to avoid focusing on foreign matter adhering to the windowpane, a second focusing button 11f which is, when the background of a subject is bright or light and darkness of the subject is too clear, used to avoid focusing on the background, a fade button 11g for fading in images and sounds at the start of scenes and for fading out them at the end of the scenes or at the time of changing scenes, and a self-timer button 11h which is used for entry of the user in the screen during videoing.

The operating portion 11 of the first housing 2 includes a fast-rewind button 11i for rewinding the cassette tape for subsequent reproduction, a fast-forward button 11j, a play button 11k, a stop button 11l, a still-frame button 11m, a TV record button 11n, and a video/photographing select button 11o, all of which are mounted on the upper surface of the rear portion of the first housing 2. An auto/manual select switch 11p is mounted on the rear surface of the first housing 2.

Figure 14:
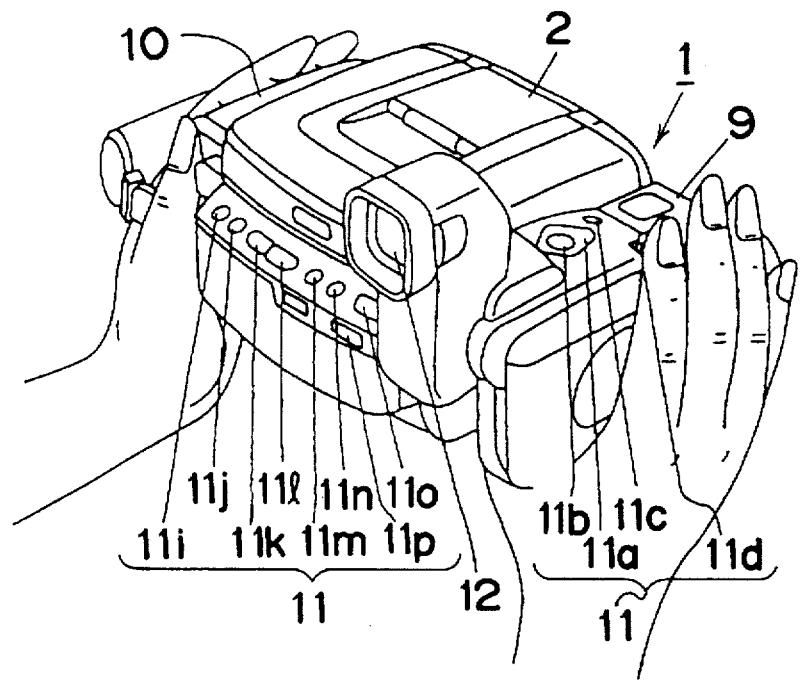
FIG. 14 is a rear perspective view of the video camera with the finder erected during ordinary videoing.
Figure 15:
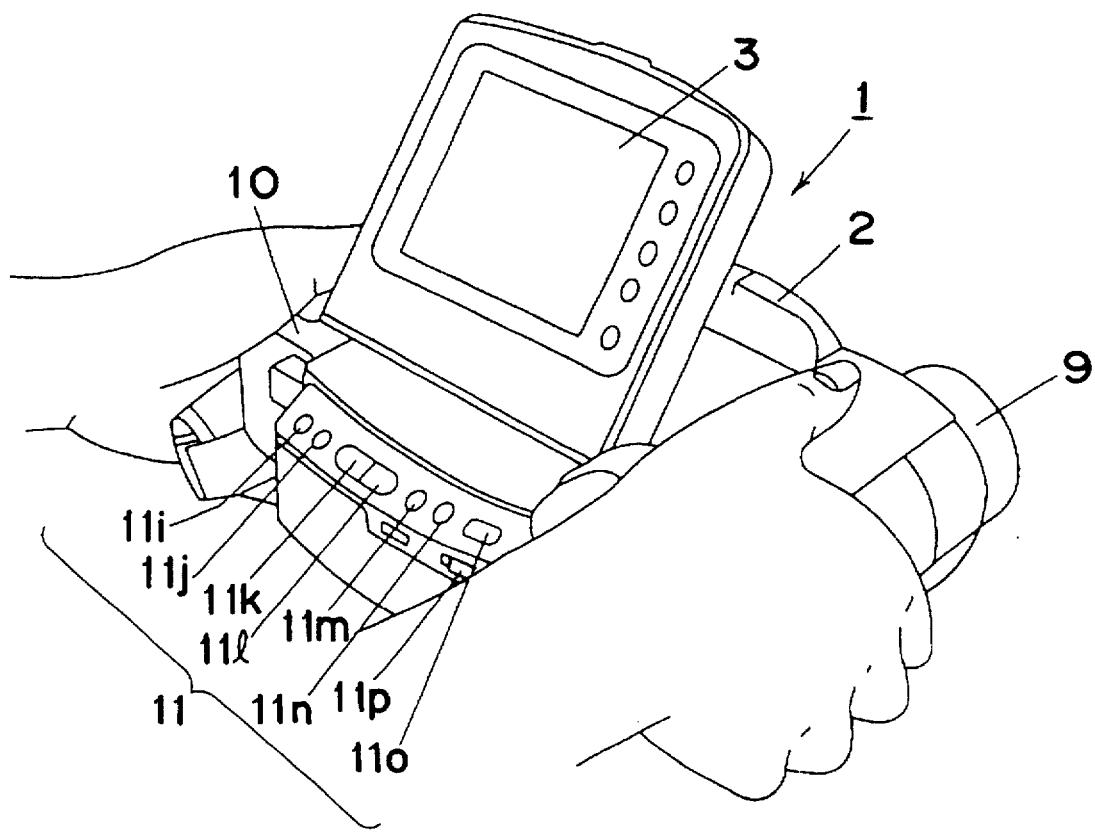
FIG. 15 is a rear perspective view of the video camera with the monitor screen inclined relative to the camera body during ordinary videoing.

Because a first variety of buttons or switches such as, for example, the on-off switch 11a, record button 11b, still-image button 11c, and zoom button 11d, which have high frequencies in use during videoing, are mounted on the third housing 9 installed on the right-hand side of the first housing 2, while a second variety of buttons such as, for example, the first focusing button 11e, second focusing button 11f, fade button 11g, and self-timer button 11h, which have relatively low frequencies in use during videoing, are mounted on the fourth housing 10 installed on the left-hand side of the first housing 2, even when a finder 12 housed in the third housing 9 or the monitor screen 3 is used in a manner as shown in FIG. 14 or 15, videoing can be carried out by sliding or depressing switches or buttons using the user's fingers without changing the condition in which the video camera 1 is held by the user's hands, thereby enhancing the operability of the video camera 1. The finder 12 referred to above is later discussed in detail.

Furthermore, because the third and fourth housings 9 and 10 have approximately the same weight, the video camera 1 is laterally well balanced and, hence, about half the weight of the video camera 1 is applied to each of the user's hands, regardless of the use of the finder 12 or the monitor screen 3. Accordingly, the video camera 1 of the present invention is easy-to-use and reduces fatigue of the user during videoing. In addition, even during the high-angle videoing or low-angle videoing, because the relative positional relationship between the third and fourth housings 9 and 10 is the same as the ordinary videoing as shown in FIG. 15 and is maintained unchanged, the weight distribution of the video camera 1 in a direction in which videoing is carried out does not change.

It is to be noted here that the layout of various switches or buttons is not limited to that specifically described above.

but can be appropriately changed. Furthermore, although in the above-described embodiment the third and fourth housings 9 and 10 are installed on the right-hand side and left-hand side of the first housing 2, respectively, the arrangement thereof may be reversed.

It is also to be noted that the third and fourth housings 9 and 10 may differ in weight. According to the inventors' investigation, even if the weight ratio of the fourth housing 10 to the third housing 9 is 1.5, about 50% of persons replied "easy-to-use".

Figure 16:
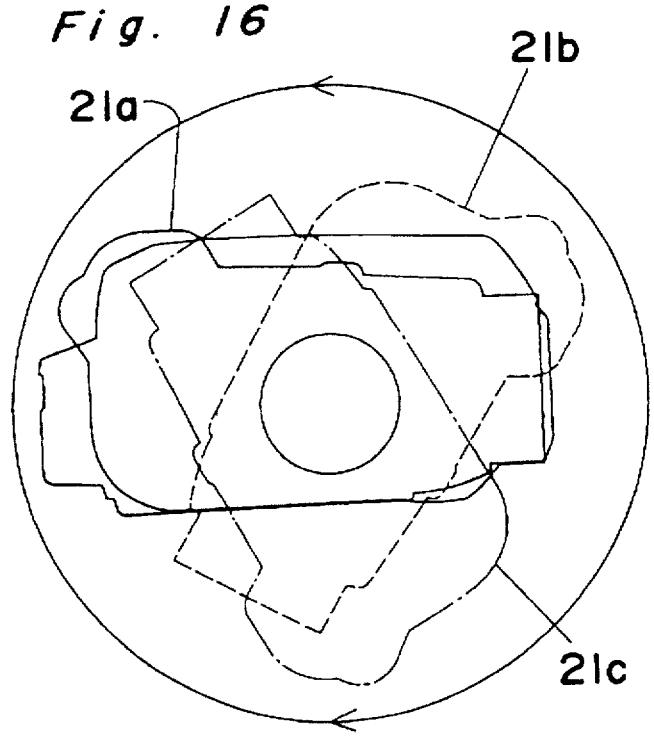
FIG. 16 is a schematic side view of a third housing having the finder, particularly indicating rotation thereof relative to a first housing.
Figure 17:
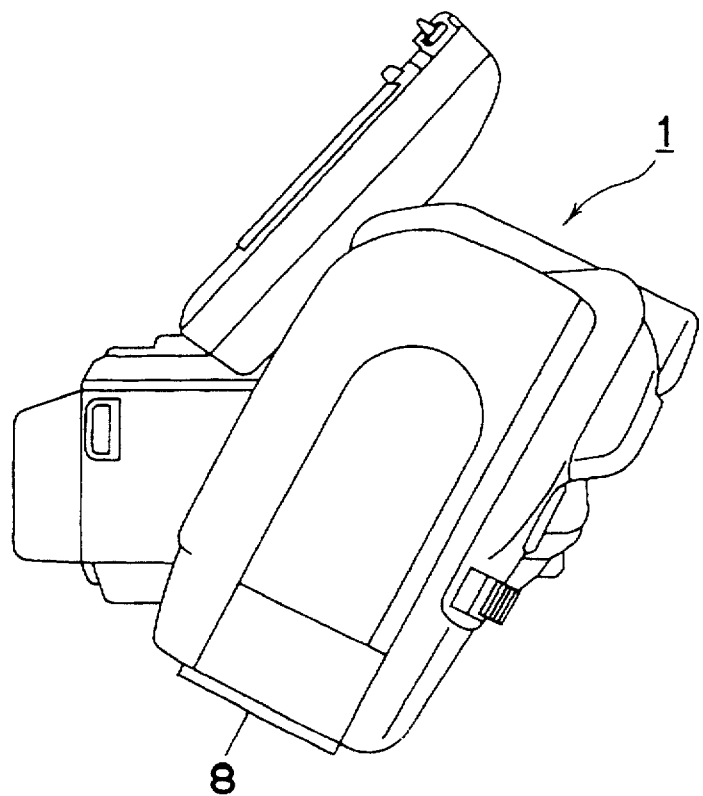
FIG. 17 is a side view of the video camera with a TV camera directed obliquely downwardly.
Figure 18:
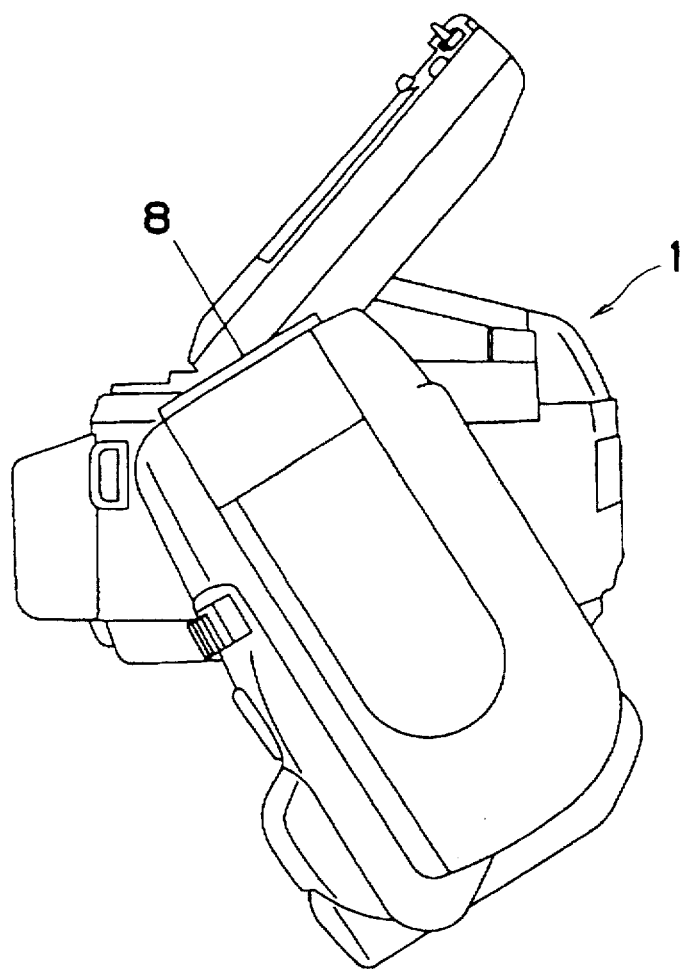
FIG. 18 is a side view of the video camera with the TV camera directed obliquely upwardly.

As shown in FIG. 16, the third housing 9 accommodating the finder 12 is rotatably mounted on the first housing 2 and can be fixed at a desired angle. Accordingly, the user can select a desired videoing angle while viewing the monitor screen 3. In FIG. 16, a solid line 21a indicates the condition in which the lens 8 is directed frontwardly as shown in FIG. 7, a dotted line 21b indicates the condition in which the lens 8 is directed obliquely downwardly as shown in FIG. 17, and a single dotted chain line 21c indicates the condition in which the lens 8 is directed obliquely upwardly as shown in FIG. 18.

Figure 19:
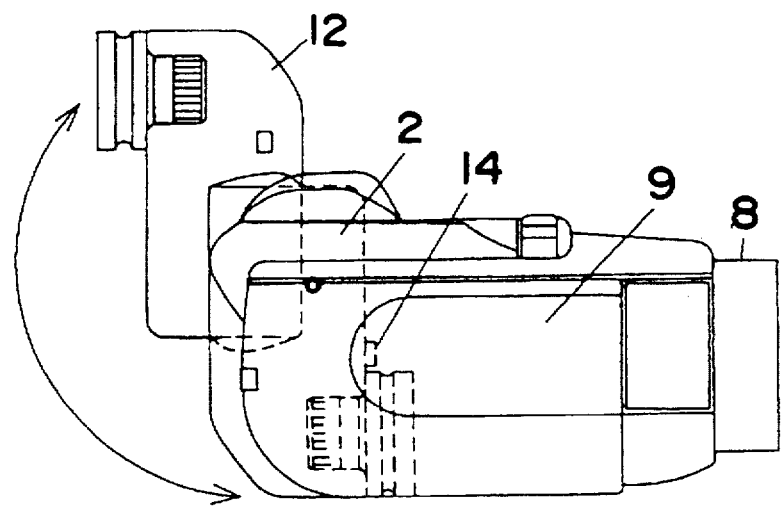
FIG. 19 is a side view of the third housing, particularly indicating the rotatable range of the finder.
Figure 20:
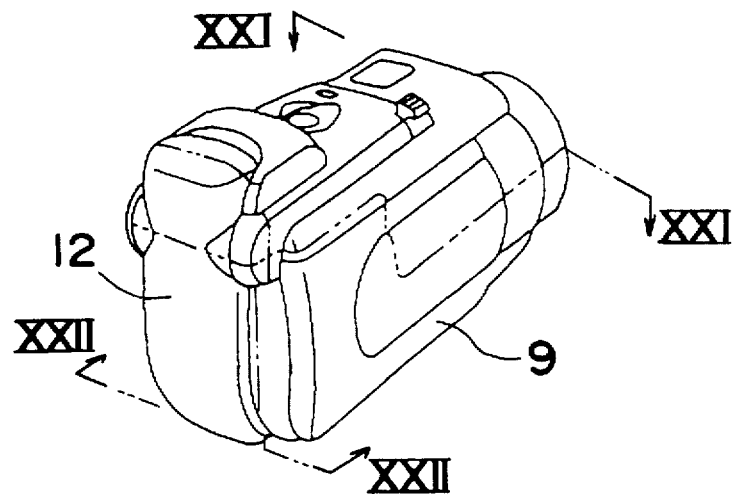
FIG. 20 is a rear perspective view of the third housing.
Figure 21:
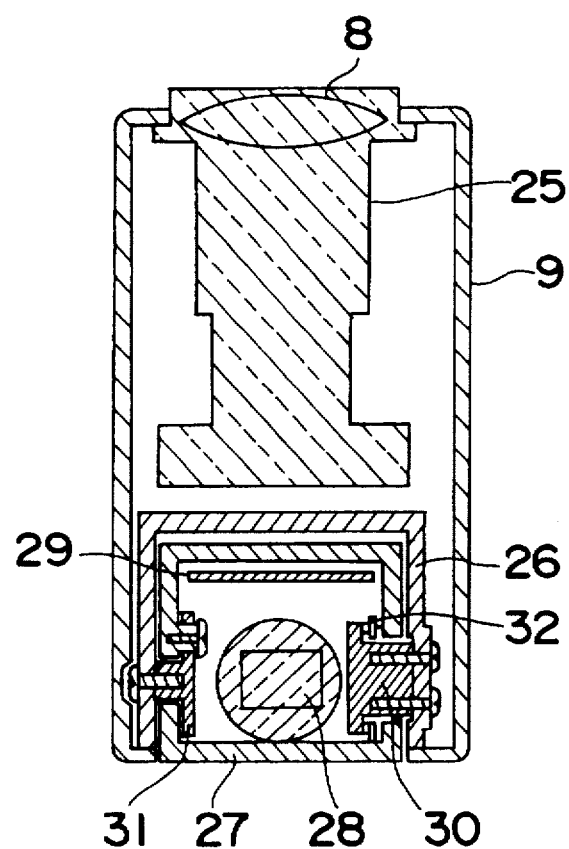
FIG. 21 is a sectional view taken along line XXI—XXI in FIG. 20.
Figure 22:
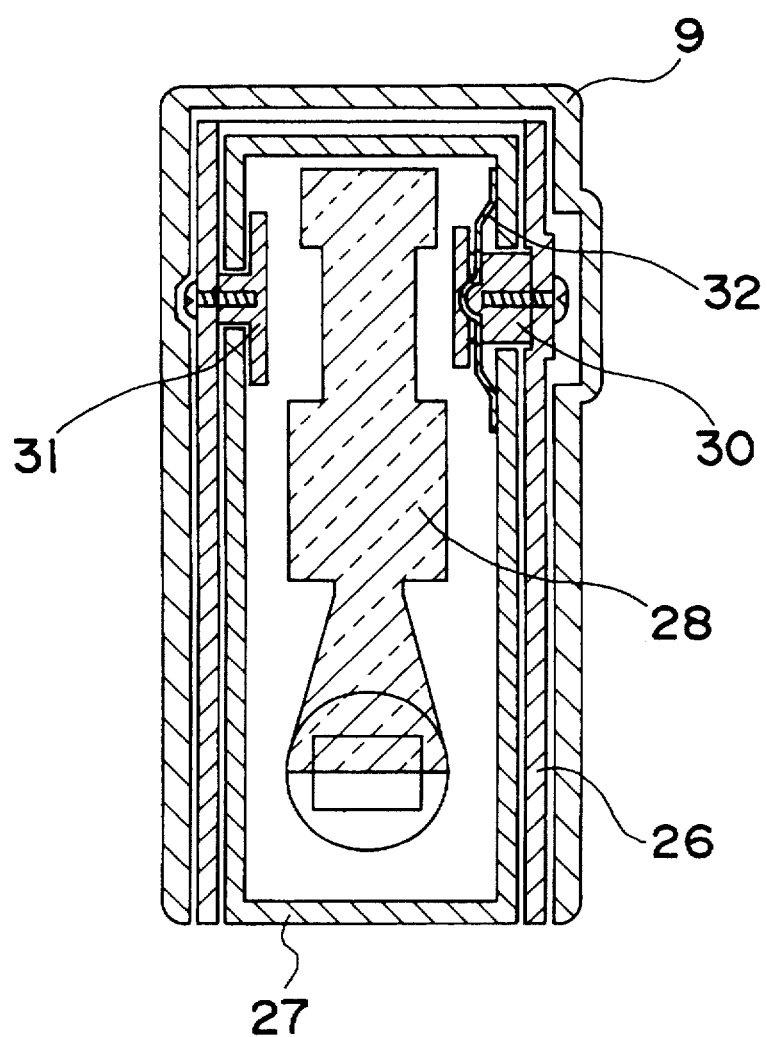
FIG. 22 is a sectional view taken along line XXII—XXII in FIG. 20.

FIGS. 19 to 22 depict only the third housing 9 and, as shown therein, the third housing 9 accommodates a TV camera portion 25 having the lens 8 referred to above, and a finder holder 26, while the finder 12 comprises a casing 27, a finder body 28 accommodated in the casing 27, and a finder plate 29 accommodated in the casing 27. The finder casing 27 is rotatably mounted on the finder holder 26 via two bosses 30 and 31, and a spring 32 interposed between the finder casing 27 and one of the bosses 30 and 31 enables the finder casing 27 to be fixed at a desired angle relative to the finder holder 26. When the finder 12 is rotated to its upright position with the video camera 1 held horizontally, as shown in FIG. 14 or 19, the user can video a subject while confirming an image caught by the TV camera portion 25 through the finder 12. As shown in FIGS. 14 and 19, when the monitor screen 4 is in its rest position and the finder 12 is in its erected (or upright) position, the viewing portion of the finder 12 is positioned above the monitor screen such that, when viewing the object through the viewing portion of the finder with one eye, the user can confirm, by viewing over the monitor screen 4 with the other eye, an overall visual field including more than the object being viewed through the finder. The use of the finder 12 is particularly effective when an image on the monitor screen 3 is unclear and cannot readily be confirmed under the influence of environmental external light during videoing, for example, at an outdoor bright place or when it is difficult for the user to follow a fast-moving subject with the use of the monitor screen 3.

As best shown in FIGS. 7 and 19, an on-off switch 13 for the monitor screen 3 is mounted on a front wall of the first housing 2, while an on-off switch 14 for the finder 12 is mounted on a vertically extending internal wall of the third housing 9. When the use of the finder 12 is desired, the monitor screen 3 is housed in the first housing 2. At this moment, the monitor screen 3 is automatically turned off by contact thereof with the on-off switch 13, whereas erection of the finder 12 results in separation of the finder 12 from the on-off switch 14, thereby automatically turning on the finder 12 and enabling the user to view, through the finder 12, the image being now videoed by the TV camera portion 25.

Because the finder 12 can be fixed at a desired angle within the range shown in FIG. 19, rotation of the finder 12 relative to the finder holder 26 in combination with that of the third housing 9 relative to the first housing 2 enables videoing at a desired one of a variety of videoing angles. Also, the monitor screen 3 and the finder 12 are automatically turned on or off according to the position of the monitor screen 3 relative to the first housing 2 and that of the finder 12 relative to the third housing 9, respectively, thus eliminating unnecessary image outputs on both the monitor screen 3 and the finder 12 and thereby saving power.

Referring again to FIGS. 6 and 7, the video camera 1 further includes a loudspeaker 15 mounted on a rear portion of the fourth housing 10 for outputting reproduced sound and a microphone 16 mounted on a front portion of the first housing 2 for collecting environmental sound, with the loudspeaker 15 and microphone 16 directed in opposite directions.

During recording, the subject being videoed through the lens 8 is recorded on a magnetic tape by a magnetic recording and reproducing means accommodated in the first housing 2, and an image of the subject is displayed on the monitor screen 3. At this moment, environmental sound is collected by the microphone 16 and is recorded on the magnetic tape by the magnetic recording and reproducing means.

During reproduction, image signals and sound signals, both recorded on the magnetic tape, are reproduced by the magnetic recording and reproducing means so that the reproduced image and sound may be outputted on the monitor screen 3 and from the loudspeaker 15, respectively.

Because the loudspeaker 15 is mounted on the rear portion of the video camera 1, the user manipulating the video camera 1 on the rear side thereof can easily hear the output sound, even if it is small, thus saving power required for sound output. Also, because it is sufficient if the output sound is relatively small, the user does not make himself a nuisance to others.

Figure 23:
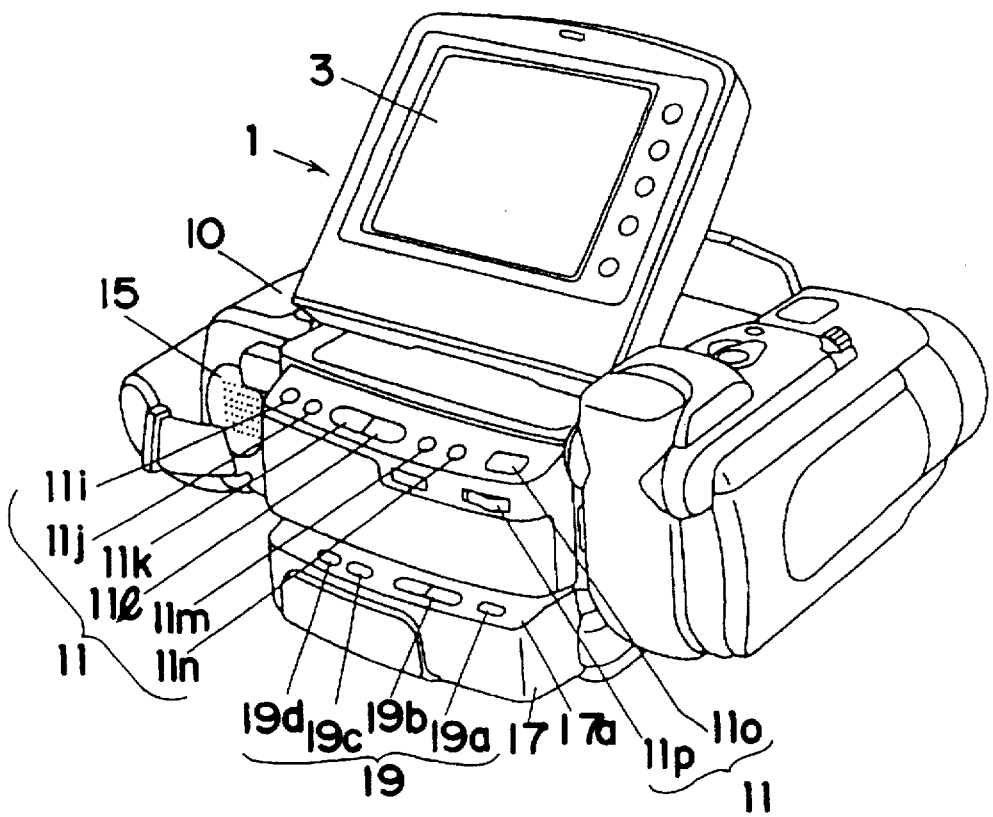
FIG. 23 is a rear perspective view of the video camera with a fifth housing accommodating a tuner mounted on the lower surface of the first housing.

FIG. 23 depicts the video camera 1 of the present invention on which a fifth housing 17 accommodating a tuner for receiving TV signals via an antenna 18 is removably mounted.

Figure 24:
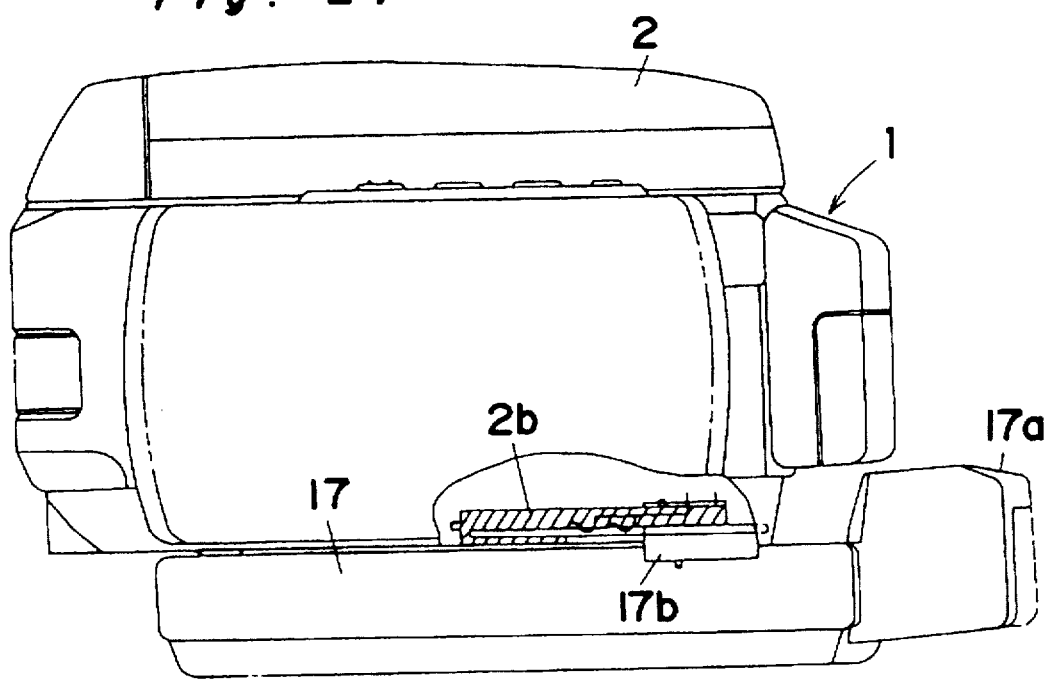
FIG. 24 is a side view of the video camera of FIG. 23 before installation of the fifth housing on the first housing.
Figure 25:
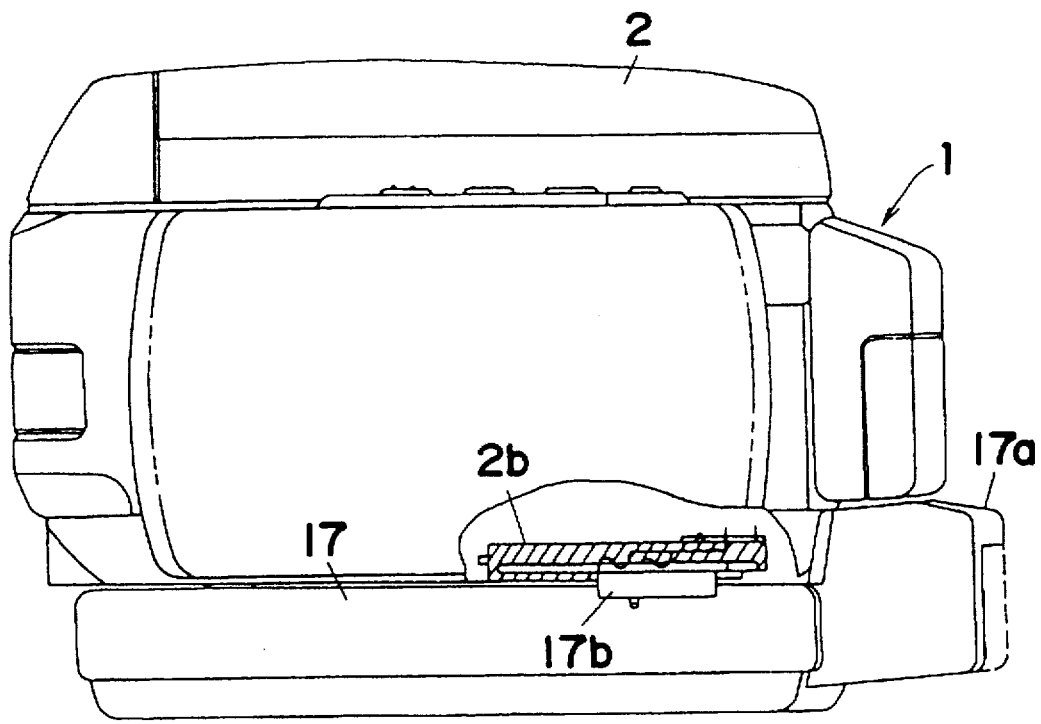
FIG. 25 is a view similar to FIG. 24, but after the installation of the fifth housing.

As shown in FIGS. 24 and 25, the first housing 2 has a connector 2b mounted on the lower surface thereof, while the fifth housing 17 has a connector 17b mounted on the upper surface thereof. When the fifth housing 17 is pushed rearwardly towards the first housing 2 with the upper surface of the former held in contact with the lower surface of the latter, the connector 17b of the fifth housing 17 is coupled with the connector 2b of the first housing 2. This coupling also accomplishes electrical connection between the first housing 2 and the fifth housing 17, thus facilitating installation of the fifth housing 17 on the first housing 2.

Figure 26:
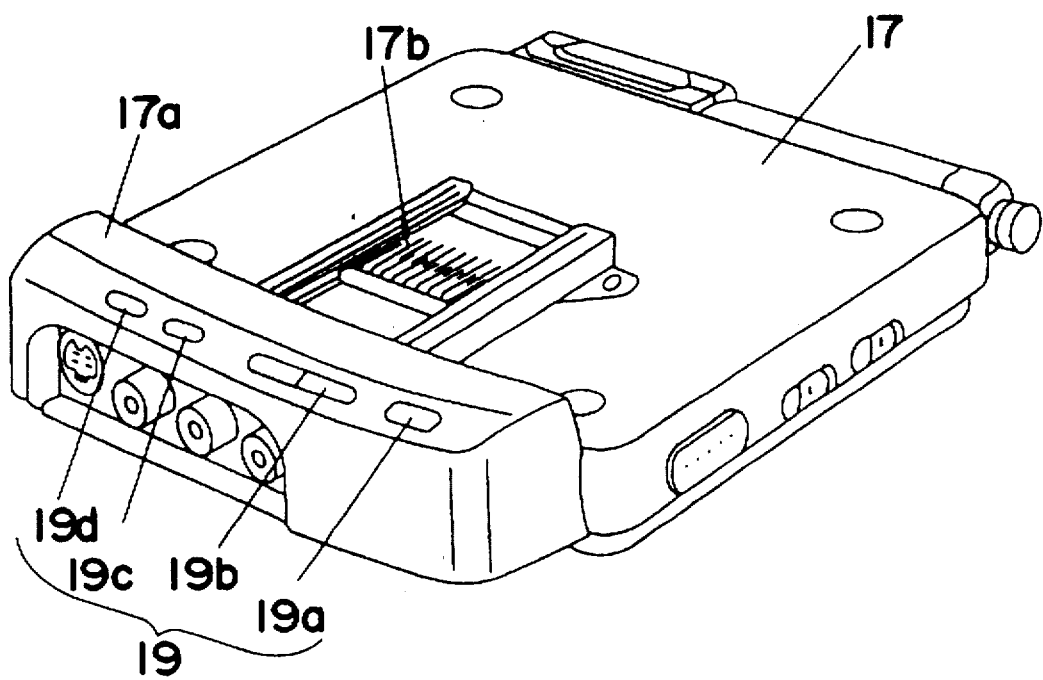
FIG. 26 is a rear perspective view of the fifth housing.
Figure 27:
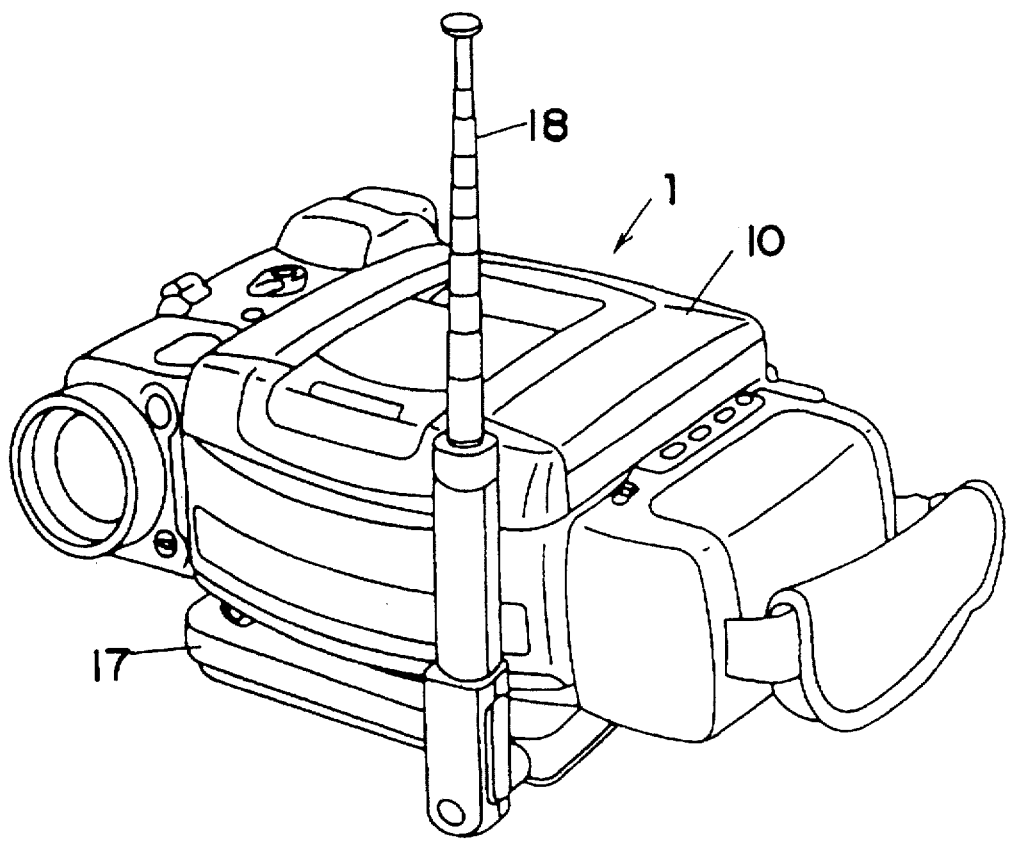
FIG. 27 is a front perspective view of the video camera of FIG. 23 with an antenna extended.
Figure 28:
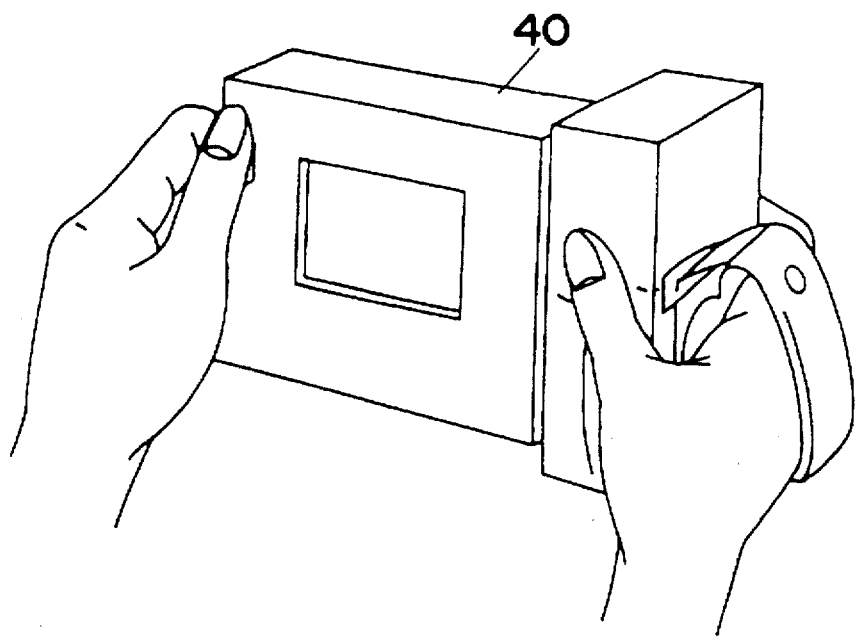
FIG. 28 is a rear perspective view of a conventional video camera having a monitor screen.
Figure 29:
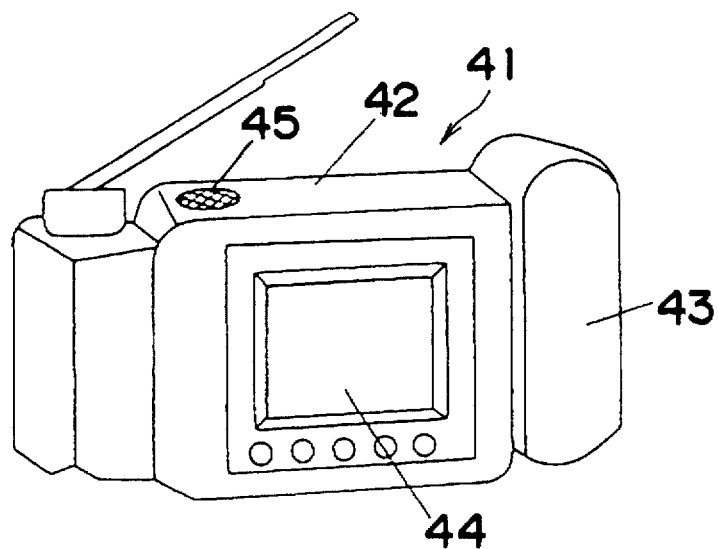
FIG. 29 is a rear perspective view of another conventional video camera having a monitor screen.
Figure 30:
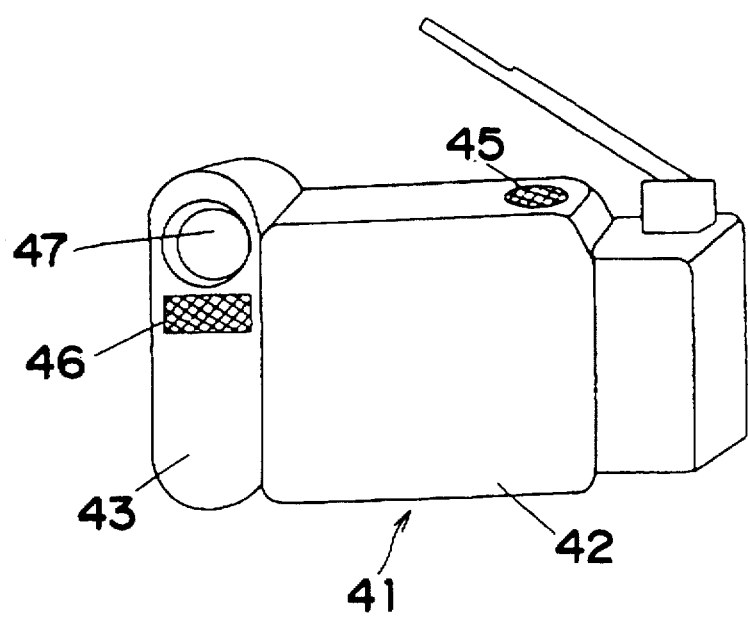
FIG. 30 is a front perspective view of the video camera of FIG. 29.
Figure 31:
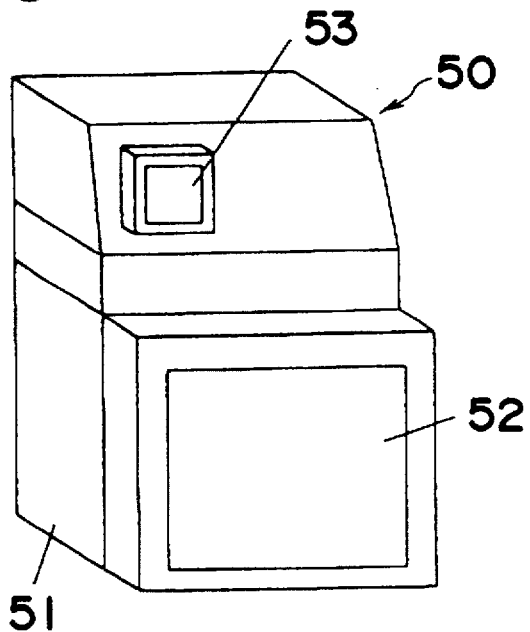
FIG. 31 is a rear perspective view of a further conventional video camera having a monitor screen.
Figure 32:
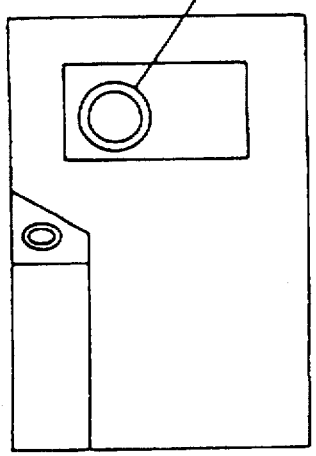
FIG. 32 is a front view of the video camera of FIG. 31.
Figure 33:
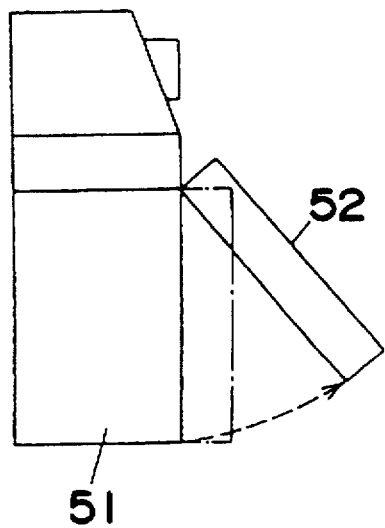
FIG. 33 is a side view of the video camera of FIG. 31.
Figure 34:
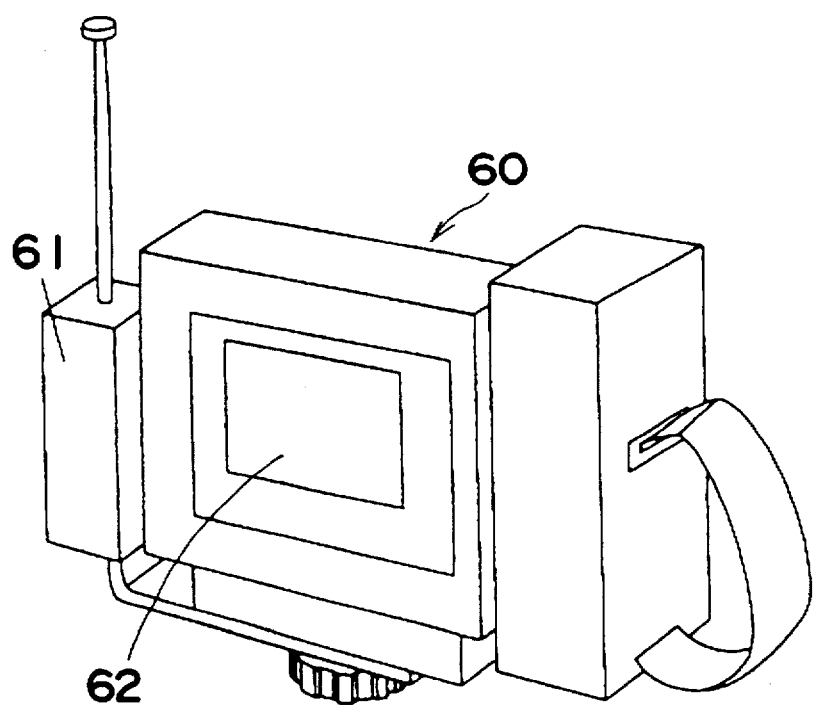
FIG. 34 is a rear perspective view of another conventional video camera having a monitor screen with a tuner mounted on one side thereof.

As shown in FIG. 26, the fifth housing 17 has a raised portion 17a formed on the rear side thereof and the telescopic antenna 18, referred to above, mounted on the front side thereof. An operating portion 19 is formed on the raised portion 17a and includes an on-off switch 19a for turning on or off a power source of the tuner, a channel select button 19b, a CM cut button 19c which is used if automatic cutting of commercials is desired, and a channel display button 19d, all of which are mounted on the upper surface of the raised portion 17a. The antenna 18 is normally laid down at its rest position but is erected as shown in FIG. 27 when reception of TV signals is desired.

Even when the coupling between the first and fifth housings 2 and 17 is completed, part of the raised portion 17a still projects rearwardly from the rear end of the first housing 2, as clearly shown in FIG. 25. The operating portion 19 of the fifth housing 17 is provided on the upper surface of this rearwardly protruding portion, above and in the vicinity of which the operating portion 11 of the first housing 2 is positioned, thus enhancing the operability of the video camera 1.

Although in the above-described embodiment part of the fifth housing 17 is illustrated as projecting rearwardly from the rear end of the first housing 2, the fifth housing 17 may partially protrude frontwardly or laterally from the first housing 2. Also, the layout of the plurality of switches or buttons 19a to 19d is not limited to that specifically described above, but can be appropriately changed.

Because the fifth housing 17 accommodating the tuner for receiving TV signals is mounted on the lower surface of the first housing 2 having the monitor screen 3 and the loudspeaker 15 both required for TV broadcast upon receipt of the TV signals, the width of the video camera 1 does not become large and the stability of the video camera 1 during manipulation is enhanced even when the tuner is mounted thereon.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A video camera comprising:
   a first housing adapted to accommodate a recording and reproducing means for recording and reproducing video signals, said first housing having a recess defined therein on an upper surface thereof;
   a second housing having a first surface and a second surface opposite to each other and housed in the recess of said first housing at its rest position at which the first surface of said second housing is opposed to the upper surface of said first housing, said second housing having a recess defined therein on the second surface thereof;
   a monitor screen mounted on the first surface of said second housing; and
   a support member having a first end to which said second housing is connected via a first hinge and a second end connected to said first housing via a second hinge, said support member being housed in the recess of said second housing when said second housing is in the rest position,
   wherein connection of said second housing with said first housing via said support member and said first and second hinges allows said monitor screen to rotate more than 180°, enabling a user to video himself while viewing said monitor screen.

2. The video camera according to claim 1, wherein a depth of the recess of said second housing is made approximately equal to a thickness of said support member.

3. The video camera according to claim 1, wherein said second housing can be fixed relative to said first housing in a spaced relationship.

4. The video camera according to claim 2, wherein said second housing can be fixed relative to said first housing in a spaced relationship.

5. A video camera comprising:
   a first housing adapted to accommodate a recording and reproducing means for recording and reproducing video signals;
   a monitor screen rotatably mounted on said first housing for movement between a rest position, in which said monitor screen confronts said first housing, and a use position;
   a second housing rotatably mounted on one side of said first housing;
   a camera portion required for videoing and accommodated in said second housing; and
   a finder having a viewing portion and being rotatably mounted on said second housing so as to be rotatable between a rest position, at which said finder is housed in said second housing, and an upright position,
   wherein, when said monitor screen is at said rest position thereof and said finder is at said upright position thereof, said viewing portion of said finder is positioned higher than said monitor screen such that, while viewing an object through said viewing portion of said finder with one eye, a user can confirm, by viewing over said monitor screen, with the other eye, the object being viewed through said viewing portion of said finder.

6. The video camera according to claim 5, wherein each of said monitor screen and said finder is automatically turned on or off according to a position thereof.

7. The video camera according to claim 5 wherein each of said monitor screen and said finder is rotated, when the video camera is held horizontally, on a vertical plane lying between the user and the object to be videotaped.

8. A video camera comprising:
   a first housing adapted to accommodate a recording and reproducing means for recording and reproducing video signals, said first housing having a front surface and a rear surface opposite to each other;
   a second housing, having a front surface and a rear surface, rotatably mounted on one side of said first housing for rotary movement between various positions including a rest position in which said front surface of said second housing faces in a same direction as said front surface of said first housing and in which said rear surface of said second housing faces in a same direction as said rear surface of said first housing;
   a camera portion required for videoing and accommodated in said second housing;
   a lens mounted on said front surface of said second housing;
   a loudspeaker mounted on the rear surface of said first housing for outputting sound reproduced by said recording and reproducing means, so as to enable a user to readily hear the sound reproduced by said recording and reproducing means; and
   a microphone mounted on the front surface of said first housing for collecting environmental sound.

9. A video camera comprising:
   a first housing;
   a monitor screen unit mounted directly on said first housing;
   a loudspeaker accommodated in said first housing;
   a second housing removably mounted on a lower surface of said first housing and adapted to accommodate a tuner for receiving TV signals,
   wherein upon receipt of the TV signals, TV broadcast is outputted to said monitor screen and said loudspeaker; and
   a first operating portion mounted on said first housing and a second operating portion mounted on said second housing, wherein said second housing has a partially protruding portion protruding from said first housing, said second operating portion being positioned on said partially protruding portion at a location close to said first operating portion.

* * * * *